United States Patent
Mata (10) Patent No.: US 11,287,227 B2
(45) Date of Patent: Mar. 29, 2022

(54) METHODS AND APPARATUS FOR A CONDUCTED ELECTRICAL WEAPON WITH POWER SAVING RESPONSIVE TO INACTIVITY

(71) Applicant: Axon Enterprise, Inc., Scottsdale, AZ (US)

(72) Inventor: Gerzain Mata, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 81 days.

(21) Appl. No.: 16/582,257

(22) Filed: Sep. 25, 2019

(65) Prior Publication Data
US 2020/0109926 A1 Apr. 9, 2020

Related U.S. Application Data

(60) Provisional application No. 62/742,142, filed on Oct. 5, 2018.

(51) Int. Cl.
*F41H 13/00* (2006.01)
*G01P 15/18* (2013.01)

(52) U.S. Cl.
CPC .......... *F41H 13/0025* (2013.01); *G01P 15/18* (2013.01)

(58) Field of Classification Search
CPC ............................. F41H 13/0025; G01P 15/18
USPC ........................................................ 361/232
See application file for complete search history.

(56) References Cited

U.S. PATENT DOCUMENTS

| | | | | |
|---|---|---|---|---|
| 5,831,199 A | * | 11/1998 | McNulty, Jr. ....... | F41H 13/0025 89/1.11 |
| 6,253,480 B1 | * | 7/2001 | Florez ..................... | F41A 17/06 42/70.06 |
| 10,288,388 B1 | * | 5/2019 | Lavin .................. | F41H 13/0025 |
| 2005/0073797 A1 | * | 4/2005 | Smith ..................... | F42B 12/36 361/232 |
| 2005/0155270 A1 | * | 7/2005 | Snyder ...................... | F41G 1/35 42/114 |
| 2011/0252684 A1 | * | 10/2011 | Ufer ........................ | F41A 19/01 42/1.03 |
| 2012/0151816 A1 | * | 6/2012 | Kleck ....................... | F41G 1/30 42/132 |
| 2012/0223860 A1 | * | 9/2012 | Leclercq ................. | G01S 19/34 342/357.63 |
| 2016/0265868 A1 | * | 9/2016 | Forsythe ................. | F41B 9/009 |

* cited by examiner

*Primary Examiner* — Scott Bauer
*Assistant Examiner* — Sreeya Sreevatsa
(74) *Attorney, Agent, or Firm* — Justin Powley (57) ABSTRACT

A conducted electrical weapon ("CEW") launches electrodes to provide a stimulus signal through a target to impede locomotion of the target. After use of the CEW, the user of the CEW may forget to turn the CEW off thereby wasting energy from the power supply (e.g., battery). The CEW includes a motion detector that detects movement of the CEW, or handle of the CEW. If the CEW does not move for a period of time, it is assumed that the CEW is no longer being used, so the CEW powers itself down to conserve energy. The components of the CEW that have been powered down may have power restored responsive to detecting operation of a control (e.g., safety) of the CEW.

20 Claims, 6 Drawing Sheets

METHODS AND APPARATUS FOR A CONDUCTED ELECTRICAL WEAPON WITH POWER SAVING RESPONSIVE TO INACTIVITY

FIELD OF THE INVENTION

Embodiments of the present invention relate to power saving in a conducted electrical weapon ("CEW") (e.g., electronic control device) that launches electrodes to provide a current through a human or animal target to impede locomotion of the target.

BRIEF DESCRIPTION OF THE DRAWING

Embodiments of the present invention will be described with reference to the drawing, wherein like designations denote like elements, and.

DETAILED DESCRIPTION

A CEW provides (e.g., delivers) a current (e.g., stimulus signal, pulses of current, pulses of charge, etc.) through tissue of a human or animal target. The stimulus signal provides a charge into target tissue. The stimulus signal may interfere with voluntary locomotion (e.g., walking, running, moving) of the target. The stimulus signal may cause pain. The pain may encourage the target to stop moving. The stimulus signal may cause skeletal muscles of the target to become stiff (e.g., lock up, freeze, etc.). The stiffening of the skeletal muscles in response to a stimulus signal may be referred to as neuromuscular incapacitation ("NMI"). NMI disrupts voluntary control of the muscles of the target. The inability of the target to control its muscles interferes with locomotion by the target.

A CEW may include electrodes that are launched from the CEW toward a target to provide the stimulus signal through the target. The electrodes may be electrically, electronically, and/or mechanically coupled to the CEW via wire tethers. The electrodes may travel a distance, for example between 1 and 100 feet, to electrically couple to the target to provide the stimulus signal through the target. The stimulus signal may be provided by a signal generator in a handle of the CEW through the target via the electrodes and their respective wire tethers. The movement caused by launching the electrodes may be detected by the CEW.

Generally, a CEW is carried by an officer (e.g., police officer, security personnel, person, etc.). During periods while the CEW is not being used, the CEW may be positioned in a holster that is suspended from the belt or hip of the officer. As the officer moves, the holster also moves thereby moving the CEW with the holster. The CEW may detect movement of the CEW as it moves with the holster.

During periods when the CEW is used to interfere with locomotion of a target, the CEW is generally held manually by (e.g., in the hands of) the officer so that the CEW may be oriented (e.g., pointed, aimed, etc.) toward the target. The CEW may be physically manipulated (e.g., manually pointed, aimed, etc.) by the officer to aim the CEW. A user interface of the CEW (e.g., trigger, reactivation, etc.) may be manually operated to deploy electrodes from the CEW, to provide the stimulus signal to the target, and/or to provide additional stimulus signal through deployed electrodes. The CEW may detect movement of the CEW by the officer in response to the officer withdrawing the CEW from the holster, aiming the CEW, operating the user interface of the CEW, returning the CEW to the holster, and/or similar such movements.

A CEW includes a power supply. A power supply provides power (e.g., energy). Generally, the power supply of a CEW provides electrical power. Providing electrical power may include providing a current at a voltage. Electrical power from a power supply may be provided as a direct current ("DC") or an alternating current ("AC"). A battery may perform the functions of a power supply. A power supply may provide energy for performing the functions of a CEW. A power supply may provide the energy for a stimulus signal. A power supply may provide energy for operating the electronic and/or electrical components (e.g., parts, subsystems, circuits, etc.) of a CEW and/or one or more cartridges. The electronic components of a CEW include those components that detect movement of the CEW. The energy of a power supply may be renewable or exhaustible. A power supply may be replaceable. The energy from a power supply may be converted from one form (e.g., electrical, magnetic, thermal, etc.) to another form to perform the functions of a CEW.

The power supply may provide power to components (e.g., CEW components) of the CEW. For example, and in accordance with various embodiments, the power supply may provide power to a plurality of CEW components, such as a signal generator, a processing circuit, a user interface, a safety, and/or a trigger, as applicable. As a further example, and in accordance with various embodiments, the power supply may also provide power to a motion detector. As a further example, and in accordance with various embodiments, the power supply may also provide power to a laser for aiming, a flashlight, a launch controller, a communication circuit, and/or a display.

A CEW may include a user interface. A user interface may include one or more controls (e.g., switches, buttons, touch screen, etc.). A control includes any electrical, electronic, mechanical, or electromechanical device suitable for manual manipulation (e.g., operation) by a user. A control may establish or break an electrical circuit. A control may include a portion of a touch screen. A control may include any type of switch (e.g., pushbutton, rocker, key, rotary, slide, thumbwheel, toggle, etc.). Operation of a control may occur by the selection of a portion of a touch screen. Operation of a control may provide information to a CEW. Operation of a control may result in performance of a function, halting performance of a function, and/or resuming performance of a function of the CEW.

A control of a user interface may permit a user of the CEW to manually interact with and/or control the operation of the CEW. A processing circuit may detect the operation of a control. A processing circuit may perform a function of the CEW in response to an operation of a control. A processing circuit may perform a function, halt a function, resume a function, and/or suspend a function of the CEW responsive to operation of one or more controls. A control may provide analog or binary information to a processing circuit.

For example, a CEW may include a safety. The safety may comprise any suitable electrical, electronic, mechanical, and/or electromechanical component. For example, the safety may comprise a switch, a touchscreen (or a portion of a touchscreen), and/or any other interface capable of operating to an enabled mode and to a disabled mode. While the safety is enabled (e.g., the enabled mode, an on-position, engaged, safety active, armed, etc.) many of the functions (e.g., providing the stimulus signal, launching electrodes, enabling a flashlight, etc.) of the CEW are inactive and cannot be used. While the safety is disabled (e.g., the disabled mode, an off-position, disengaged, safety inactive, disarmed, etc.), many, if not all, of the functions of the CEW are active or may be activated by operating a control of the user interface.

Operating the safety from enabled to disabled may activate (or enable activation of) some functions (e.g., flashlight, lasers for aiming, communication circuit, accelerometer, user interface, processing circuit, power to cartridges, etc.) while other functions (e.g., launch controller, signal generator, etc.) are activated by operation of another control (e.g., trigger, reactivate, etc.).

For example, a CEW may include a trigger (e.g., switch, button, etc.). While the safety is disabled, the trigger may be operated by the user to launch electrodes (e.g., a launch controller) and/or generate a stimulus signal (e.g., a signal generator). While the safety is enabled, operating the trigger will not result in generation of a stimulus signal or launch of electrodes. The safety may control (e.g., enable, restrict, etc.) operation of the trigger using any suitable electrical, electronic, mechanical, and/or electromechanical component capable of enabling and/or restricting operation of the trigger. The safety may be operated based on any suitable input. For example, the safety may be operated from enabled to disabled, or disabled to enabled, based on a user input (e.g., manual operation of a switch, button, etc.; input into an interface, touchscreen, etc.; etc.), in response to receiving a safety signal (e.g., electrical signal received from a user device, holster, etc., comprising instructions to enable or disable the safety), and/or the like.

A user interface may provide information to a user. A user may receive visual and/or audible information from a user interface. A user may receive visual information via devices that visually display (e.g., present, show, etc.) information (e.g., LCDs, LEDs, light sources, graphical and/or textual display, display, monitor, touchscreen, etc.). A user interface may include a communication circuit for transmitting information to an electronic device (e.g., smart phone, tablet, etc.) for presentation to a user. In various embodiments, the user interface may comprise the safety.

While the safety is disabled, a CEW may monitor its own movement. Monitoring its own movement may include using one or more detectors to determine whether the CEW is presently moving or has moved within a period of time. Movement may be detected along one or more axes. For example, one or more detectors may detect movement along an x-axis, a y-axis, and/or a z-axis of a Cartesian coordinate system. A change in the position and/or orientation of the CEW, or any portion thereof, from one coordinate in the coordinate system to another coordinate in the coordinate system may indicate movement of the CEW. Detectors may be used to detect movement in accordance with any coordinate system (e.g., polar, cylindrical, spherical, homogeneous, curvilinear, orthogonal, skew, log-polar, Plücker, Lagrangian, Hamiltonian, Barycentric, trilinear, etc.).

Operating the safety from disabled to enabled is an indication that the user is no longer using the CEW, or that the user desires to disarm (or prevent activation of) the CEW.

Any type of detector or detectors may be used to detect movement of the CEW. Detectors (e.g., sensors) may include radar-based sensors, infrared sensors, microwave sensors, gyroscopes, ultrasonic detectors, acoustic sensors, optical sensors, vibration detectors, electromagnetic sensors, accelerometers, and/or any other device or component capable of detecting movement. In an implementation, an accelerometer is used to detect movement of the CEW.

Responsive to detecting movement or the lack of movement (e.g., stationary), a CEW may perform an operation. For example, upon detecting no movement of the CEW for a period of time, a CEW may shut-down (e.g., discontinue, turn-off, power down, etc.) functions and/or components of the CEW. Shutting down a function and/or a component of a CEW may decrease the amount of power drawn (e.g., used) from the power supply of the CEW. Decreasing the amount of power used may increase the amount of time the power supply may provide power to the CEW to perform the functions of the CEW. In that regard, shutting down a function and/or a component of a CEW may increase the useful life of the power supply, and/or may increase an amount of time between charging and/or replacement of the power supply.

Detecting no movement of the CEW for a period of time may indicate that the user of the CEW has ceased to use the CEW (e.g., regardless of whether the safe is disabled). Detecting no movement for a period of time may indicate that continued use is unlikely, so the CEW, or at least some functions thereof, may be turned off.

A CEW may detect one or more periods of inactivity (e.g., a period of time with no detected movement). A CEW may take an action responsive to the lapse of each period. For example, upon detecting a first period of no movement, a CEW may turn off a first set of functions and/or components, upon detecting a second period of no movement, a CEW may turn off a second set of functions and/or components, and so forth until a portion of the functions and/or components of the CEW have been turned off. In some embodiments, the portion of the functions and/or components may comprise all or most of the functions and/or components of the CEW have been turned off. The one or more periods of time may be measured (e.g., detected, timed, etc.) in serial and/or parallel.

For example, upon detecting lapse of a first period of time with no movement of the CEW, the CEW may power down a flashlight and aiming lasers. Upon detecting lapse of a second period of time, the CEW may power down the signal generator, the launch controller, and the cartridges. Upon detecting a lapse of a third period of time, a CEW may power down the display on the user interface. Upon detecting a lapse of a fourth period of time, the CEW may power down the communication circuit. Upon detecting a fifth period of time, the CEW may power down the detectors that detect movement and the processing circuit may enter a low-power state. During each successive period in which additional components of the CEW are powered down, more energy is saved so that the power supply lasts longer.

The functions and/or components that are powered down upon lapse of a period of time may be combined and/or changed from the above in any way. Some functions and/or components of a CEW may remain powered regardless of the amount of time the CEW has not moved. A function and/or component may be powered down completely (e.g., off) or partially (e.g., a low power state). A CEW may provide an indication (e.g., presentation on display, audible sound, etc.) prior to, upon, and/or after powering down one or more functions and/or components. A CEW may transmit a message (e.g., notice) prior to, upon, and/or after powering down one or more functions and/or components.

A function and/or a component of a CEW may be powered up after being powering down. A CEW may power up functions and/or the components in any order. A CEW may power up functions and/or components at the same time or approximately the same time. A CEW may power up functions and/or components in response to an action by a user (e.g., operating a control of the user interface, pulling the trigger, operating the safety to a disabled mode, operating the safety to enabled and then disabled, activating a reactivate button, replacing a cartridge, etc.), detecting movement of the CEW (e.g., prior to shutting down the movement detectors), receiving a communication (e.g., prior to shutting down the communication circuit), and/or the like.

One or more functions, components, and/or portions of a function or component of the CEW may remain in a powered state. For example, a processing circuit may remain powered up or in a low-power state to detect operation of one or more controls of the user interface. Detectors that detect movement may remain powered up to detect and report movement to a processing circuit. Any function and/or component may remain powered up or in a low-power state to facilitate exit from the powered-down state.

Figure 1:
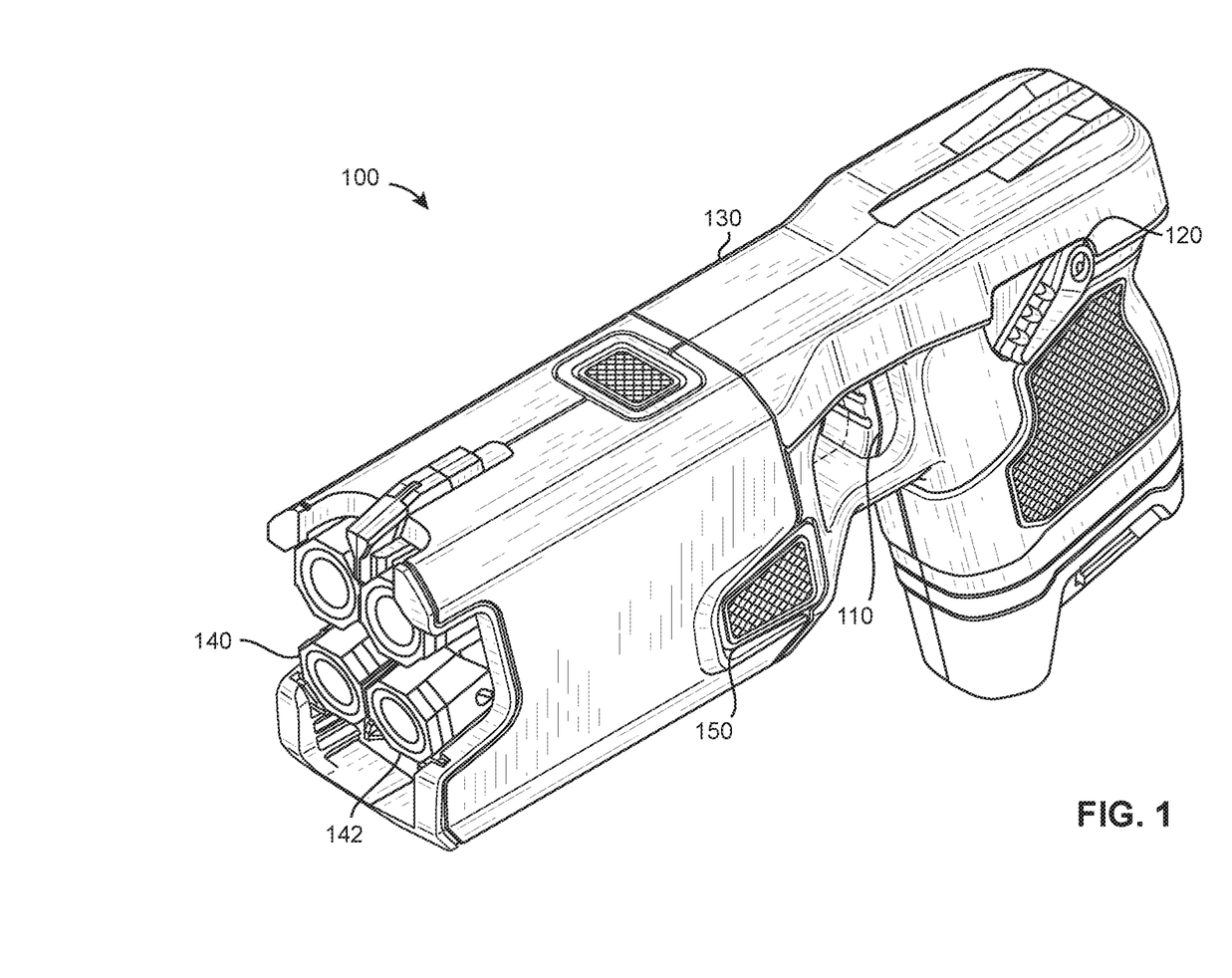
FIG. 1 is a perspective view of an implementation of a CEW according to various aspects of the present disclosure.

In various embodiments, and with reference to FIG. 1, a CEW 100 is disclosed. CEW 100 may be an implementation of a CEW as discussed above. CEW 100 includes a handle 130, a cartridge 140, and a cartridge 142. Handle 130 includes a safety 120, a trigger 110, and a reactivate 150. CEW 100 may perform the functions of a CEW as discussed above. Safety 120 and trigger 110 perform the functions of a safety and a trigger respectively, as discussed above. Reactivate 150 performs the function of a control (e.g., button, switch, user interface, etc.) to provide an additional stimulus signal after launch of electrodes from cartridge 140 and/or cartridge 142. Safety 120, trigger 110, and/or reactivate 150 may be part of a user interface.

Cartridge 140 and 142 each include two or more electrodes, a propellant for launching the electrodes, and/or a processing circuit. In various embodiments, the processing circuit may also be located in handle 130. Handle 130 may provide signals to cartridge 140 and/or 142 to activate the propellant to launch the electrodes toward a target. The signals that launch the electrodes from a cartridge may be provided responsive to activation of trigger 110.

Handle 130 may provide a stimulus signal to cartridge 140 and/or 142. Electrodes from cartridges 140 and/or 142 may be launched toward a target. The electrodes may establish an electrical coupling with the target. The stimulus signal may be provided through target tissue via the electrodes to impede locomotion of the target. After delivery of an initial stimulus signal upon launch of electrodes, a further (e.g., a second, an additional, another, etc.) stimulus signal may be delivered via the launched electrodes in response to activating (e.g., pressing, switching, interfacing with) reactivate 150. CEW 100 may include one reactivate 150. A CEW may include a reactivate 150 for a number of cartridges CEW 100 is configured to receive. For example, operation of reactivate 150 may provide an additional stimulus signal via the launched electrodes of cartridge 142. Operation of another reactivate 150 (not shown) may provide an additional stimulus signal via the launched electrodes of cartridge 140.

After use (e.g., launch of electrodes), cartridge 140 and/or cartridge 142 may be removed (e.g., detached, extracted, etc.) from handle 130 and replaced with an unused cartridge to launch additional electrodes to provide a stimulus signal through a target.

Figure 2:
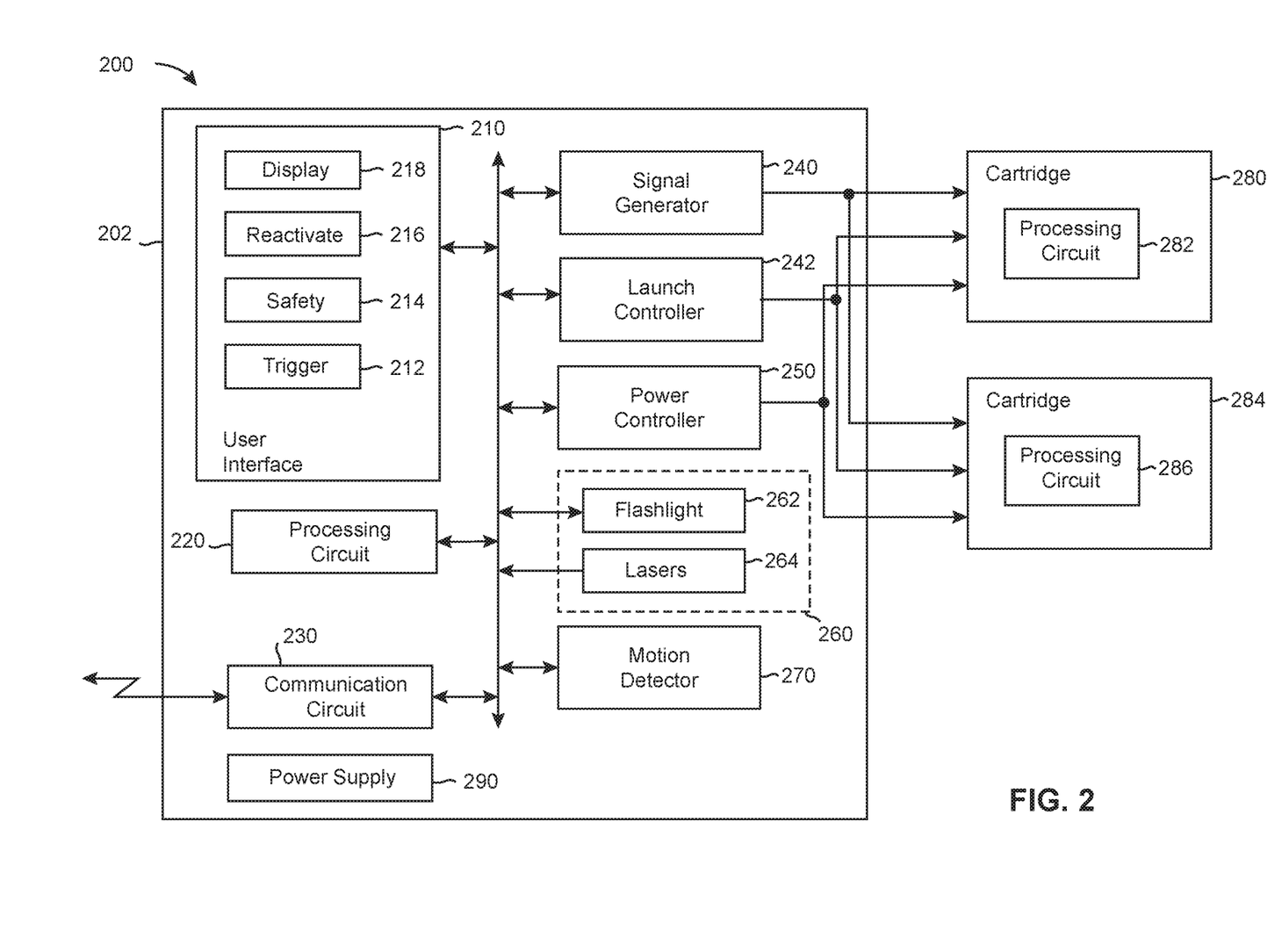
FIG. 2 is a block diagram of the CEW of FIG. 1.

In various embodiments, and with reference to FIG. 2, a CEW 200 is disclosed. CEW 200 may be an implementation of a CEW as discussed above. CEW 200 may include a handle 202, a cartridge 280, and a cartridge 284. CEW 200 and handle 202 perform the functions of a CEW and a handle respectively, as discussed above. Cartridge 280 and cartridge 284 each perform the functions of a cartridge as discussed above.

Handle 202 may include one or more of a user interface 210, a processing circuit 220, a communication circuit 230, a signal generator 240, a launch controller 242, a power controller 250, an accessory 260 (e.g., accessories 260), a motion detector 270, and/or a power supply 290. User interface 210 may include one or more of a display 218, a reactivate 216, a safety 214, and/or a trigger 212. Accessories 260 may include one or more of a flashlight 262 and/or lasers 264. User interface 210 performs the functions of a user interface as discussed above.

A processing circuit includes any circuitry, electrical components, electronic components, software, computer-readable mediums, and/or the like configured to perform various operations and functions. A processing circuit may include circuitry that performs (e.g., executes) a stored program. A processing circuit may include a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or the like.

A processing circuit may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). A processing circuit may include data buses, output ports, input ports, timers, memory, arithmetic units, and/or the like.

A processing circuit may provide and/or receive electrical signals whether digital and/or analog in form. A processing circuit may provide and/or receive digital information via a data bus using any protocol. A processing circuit may receive information, manipulate information, and provide manipulated information. A processing circuit may store information and retrieve stored information. A processing circuit may include memory for storage and/or retrieval of information. Information received, stored, and/or manipulated by a processing circuit may be used to perform a function, control a function, and/or to perform (e.g., execute) a stored program.

A processing circuit may control the operation and/or function of other circuits and/or components of a system such as a CEW. A processing circuit may receive status information regarding the operation of other components, perform calculations with respect to the status information, and provide commands (e.g., instructions) to one or more other components. A processing circuit may command another component to start operation, continue operation, alter operation, suspend operation, or cease operation. Commands and/or status may be communicated between a processing circuit and other circuits and/or components via any type of bus (e.g., SPI bus) including any type of data/address bus.

A processing circuit may include or be in electronic communication with a computer-readable medium. The computer-readable medium may store, retrieve, and/or organize data. As used herein, the term "computer-readable medium" includes any storage medium that is readable by a machine (e.g., computer, processor, processing circuit, etc.). Storage medium includes any devices, materials, and/or structures used to place, keep, and retrieve data (e.g., information). A storage medium may be volatile or non-volatile. A storage medium may include any semiconductor (e.g., RAM, ROM, EPROM, flash, etc.), magnetic (e.g., hard disk drive (HDD), etc.), solid state (e.g., solid-state drive (SSD), etc.), optical technology (e.g., CD, DVD, etc.), or combination thereof. Computer-readable medium includes storage medium that is removable or non-removable from a system. Computer-readable medium may store any type of information, organized in any manner, and usable for any purpose such as computer readable instructions, data structures, program modules, or other data. The computer-readable medium may comprise a non-transitory computer-readable medium. The non-transitory computer-readable medium may include instructions stored thereon. Upon execution by the processing circuit, the instructions may allow the processing circuit to perform various functions and operations disclosed herein.

A signal generator provides a signal (e.g., stimulus signal, current, current pulse, a series of current pulses, stimulus signal, etc.). A signal may include a pulse of current. A signal may include two or more (e.g., a series of) current pulses. A current pulse provided by a signal generator may include a high voltage portion for electrically coupling a CEW to a target. The high voltage portion of a pulse may ionize air in one or more gaps in series with the signal generator. Ionizing air may establish one or more ionization paths to deliver the current pulse through target tissue. A pulse may provide an amount of charge to target tissue. A signal generator may provide current pulses at a rate of so many pulses per second. The signal comprised of the pulses of current (e.g., stimulus signal) may interfere with (e.g., impede) locomotion of the target. The signal may impede locomotion by inducing fear, pain, and/or NMI.

The pulses of a stimulus signal may be delivered at a rate (e.g., 22 pps, 44 pps, 50 pps, etc.) for a period of time (e.g., 5 seconds, 10 seconds, etc.). Each pulse of the stimulus signal may provide an amount of charge (e.g., 63 microcoulombs, etc.). Each pulse may establish electrical connectivity (e.g., ionizing air in one or more gaps) and interfere with locomotion of the target by providing an amount of charge per pulse to target tissue.

A signal generator includes circuits for receiving electrical energy and for providing the stimulus signal. Electrical/electronic circuits (e.g., components) of a signal generator may include capacitors, resistors, inductors, spark gaps, transformers, silicon-controlled rectifiers ("SCRs"), analog-to-digital converters, and/or the like. A processing circuit may cooperate with and/or control the circuits of a signal generator to produce a stimulus signal.

A signal generator may receive electrical energy from a power supply. A signal generator may convert the energy from one form of energy into a stimulus signal for ionizing gaps of air and interfering with locomotion of a target. A processing circuit may cooperate with and/or control a power supply in its provision of energy to a signal generator. A processing circuit may cooperate with and/or control a signal generator in converting the received electrical energy into a stimulus signal. A processing circuit may cooperate with and/or control a signal generator to select a pair of electrodes for providing the stimulus signal.

A filament (e.g., wire, wire tether, etc.) conducts a current. A filament electrically couples a signal generator to an electrode. A filament carries a current at a voltage for ionizing air in one or more gaps and/or impeding locomotion. A filament mechanically couples to an electrode. A filament mechanically couples to an interface of a cartridge. A filament deploys from a store (e.g., cavity) in an electrode (or in the cartridge) upon launch of the electrode. Movement of an electrode toward a target deploys (e.g., pulls) the filament from the store to deploy the filament. A filament extends (e.g., stretches, is positioned, etc.) between a cartridge and a target. The cartridge electrically couples to a signal generator for providing a stimulus signal to a target via the filament and an electrode.

An electrode couples to a filament and is launched toward a target to deliver a current through the target. An electrode may include aerodynamic structures to improve accuracy of flight of the electrode toward the target. An electrode may include structures (e.g., spear, barbs, etc.) for mechanically coupling to a target.

A propellant propels (e.g., launches) one or more electrodes from a cartridge toward a target. A propellant applies a force (e.g., from expanding gas) on a surface of the one or more electrodes to push (e.g., launch) the one or more electrodes from the cartridge toward the target. The force applied to the one or more electrodes is sufficient to accelerate the electrodes to a velocity suitable for traversing a distance to a target, for deploying the respective filaments stowed in the one or more electrodes (or in the cartridge), and for coupling, if possible, the electrodes to the target. A processing circuit may ignite (or cause to ignite) a propellant to launch electrodes. A processing circuit may provide a signal for igniting (or causing to ignite) the propellant. A processing circuit may ignite (or cause to ignite) a propellant in response to operation of a control (e.g., trigger 110/212, with brief reference to FIGS. 1 and 2).

Cartridge 280 and 284 include processing circuit 282 and processing circuit 286 respectively. Processing circuit 282 and 286 receive power from handle 202. Power controller 250 and/or processing circuit 220 controls whether power is provided to processing circuit 282 and/or processing circuit 286. Cartridge 280 and 284 further include two electrodes and a pyrotechnic, which are not shown. Launch controller 242 initiates the launch of the electrodes from a cartridge by igniting the pyrotechnic in the cartridge. Signal generator 240 generates the stimulus signal and provides the stimulus signal through the target via the launched electrodes.

Power supply 290 provides the power (e.g., electrical) to perform the functions of CEW 200. Power supply 290 may be implemented as a battery. Power supply 290 may be similar to any other power supply discussed herein. Power supply 290 may provide power to the components of handle 202, cartridge 280 and cartridge 284.

Power controller 250 may control which components receive power from power supply 290. Power controller 250 may permit (e.g., control, direct, etc.) power to be supplied to a component or removed from a component. Power controller 250 may provide power to or remove power from (e.g., cease to provide power to) a component in response to the expiration of a period of time. Power controller 250 may cooperate with processing circuit 220 and/or motion detector 270 to provide power to and/or remove power from a component.

Some or all of the functions of power controller 250 may be performed by processing circuit 220. Power controller 250 may be controlled, wholly or in part, by processing circuit 220.

A detector detects (e.g., measures, witnesses, discovers, monitors, etc.) a physical property (e.g., intensive, extensive, isotropic, anisotropic, etc.). A physical property may include any physical property such as, for example, acceleration, a force of gravity, capacitance, electric charge, electric impedance, and electric potential. A detector may detect a quantity, a magnitude, and/or a change in a physical property. A detector may detect a physical property and/or a change in a physical property directly and/or indirectly. A detector may detect a physical property and/or a change in a physical property of an object. A detector may detect a physical quantity (e.g., extensive, intensive). A detector may detect a change in a physical quantity directly and/or indirectly. A physical quantity may include an amount of time, an elapse (e.g., lapse, expiration) of time, an electric current, an amount of electrical charge, a current density, an amount (e.g., magnitude) of capacitance, an amount of resistance, a magnitude (e.g., value) of a voltage and/or a current. A detector may detect one or more physical properties and/or physical quantities at the same time or at least partially at the same time.

A detector may transform a detected physical property from one physical property to another physical property (e.g., electrical to kinetic). A detector may transform (e.g., mathematical transformation) a detected physical quantity. A detector may relate a detected physical property and/or physical quantity to another physical property and/or physical quantity. A detector may detect one physical property and/or physical quantity and deduce the existence of another physical property and/or physical quantity.

A detector may cooperate with a processing circuit, such as processing circuit 220, or may include an integrated processing circuit for detecting, transforming, relating, and/or deducing physical properties and/or physical quantities. A processing circuit may include any circuit for detecting, transforming, relating, and/or deducing physical properties and/or physical quantities. For example, a processing circuit may include a voltage sensor, a current sensor, a charge sensor, a light sensor, a heat sensor (e.g., thermometer), an electromagnetic signal sensor, and/or any other suitable or desired sensor.

A detector may provide information (e.g., report). A detector may provide information regarding a physical property and/or a change in a physical property. A detector may provide information regarding a physical quantity (e.g., magnitude) and/or a change in a physical quantity. A detector may provide information to a processing circuit.

A detector may detect physical properties for determining whether a current was delivered to a target.

A motion detector detects motion. A motion detector may detect a physical quantity (e.g., heat, electricity, vibration, radio wave, electromagnetic wave, gravity, etc.) to detect motion. A motion detector may detect motion in one or more directions. A motion detector may detect and/or relate detection of motion, or the lack thereof, to any coordinate system.

A motion detector may provide information (e.g., data, signal) responsive to detecting motion and/or to detecting a lack (e.g., absence) of motion. A motion detector may provide raw (e.g., unprocessed, without calculations) data to one or more components to perform one or more computations. A computation may include detecting motion or a lack of motion. A processing circuit may receive information from a motion detector. A processing circuit may perform computations to determine whether the motion detector has detected or not detected motion.

A motion detector may detect a force of gravity. A motion detector may use the force of gravity to detect movement of the CEW. A motion detector may use (e.g., factor in) or exclude (e.g., factor out) a force of gravity in the information reported by the detector. A motion detector may exclude the force of gravity to report movement related to movement of the CEW only.

A motion detector may measure a passage of time. A motion detector may provide information regarding detecting motion or the absence thereof for a period of time. A motion detector may cooperate with a processing circuit to measure a passage of time. Information provided by a motion detector may include data and/or a signal. Information may include providing a signal when a CEW does not move for a period of time. Information may include providing a signal each instance motion of a CEW is detected.

A processing circuit may receive information from a motion detector. A processing circuit, as opposed to the motion detector or in cooperation with the motion detector, may measure a passage of time. A processing circuit may use information provided by a motion detector to determine whether a CEW has moved or not moved during a period of time. A processing circuit may perform an operation in response to motion, or a lack of motion, of a CEW. A processing circuit may perform an operation in response to motion, or a lack of motion, detected during a period of time.

An operation performed by a processing circuit may include providing power to or removing power from one or more components of the CEW. A processing circuit may cooperate with a power controller to provide power to or remove power from one or more components of the CEW.

An operation performed by a processing circuit may include providing instructions to one or more components of the CEW. For example, a processing circuit may communicate with a safety to instruct the safety to operate in a disabled mode or an enabled mode. In that regard, in response to determining that the CEW has not moved for a period of time, the processing circuit may instruct the safety to operate in an enabled mode (e.g., prevent activation of the CEW). In response to determining that the CEW has moved, the processing circuit may instruct the safety to operate in a disabled mode (e.g., allow activation of the CEW). In various embodiments, manual operation of the safety into the disabled mode may be required.

As discussed above, a processing circuit, power controller, and/or motion detector may track (e.g., monitor, measure, calculate, etc.) one or more periods of time and perform an operation in accordance with detecting motion or detecting a lack of motion during the one or more periods of time.

In an implementation, motion detector 270 reports motion data to processing circuit 220. Processing circuit 220 performs calculations on the motion data provided by motion detector 270 to determine whether CEW 200 is moving or is stationary. For example, motion detector 270 reports motion along an x-axis, a y-axis, and/or a z-axis. Processing circuit 220 determines whether the motion reported along the axes corresponds to movement of CEW 200. Processing circuit 220 may use the data from motion detector 270 to detect movement in any direction (e.g., along any axis).

In response to the calculations performed by processing circuit 220, processing circuit cooperates with power controller 250 to provide power to or to remove power from components of CEW 200. In one implementation, processing circuit 220 may further measure the passage of time to detect a lack of motion for one or more periods of time. Processing circuit 220 may perform operations in response to detecting motion or detecting a lack of motion during a period of time and/or after the lapse of a period of time.

In one implementation, motion detector 270 detects motion and performs calculations on the motion data to determine whether CEW 200 has moved or not moved. Motion detector 270 may detect movement in any direction. Motion detector 270 may measure a passage of time. Motion detector 270 may detect motion or the lack of motion of CEW 200 during one or more periods of time. Motion detector 270 may report motion or the lack of motion during one or more periods of time to processing circuit 220 and/or power controller 250. Processing circuit 220 and/or power controller 250 may respond to information provided by motion detector 270 to provide power to or to remove power from one or more components of CEW 200.

For example, motion detector 270 detects movement of CEW 200 along the axes of a Cartesian coordinate system (e.g., x-axis, y-axis, z-axis). Motion detector 270 and/or processing circuit 220 measures the lapse of a period of time. In response to motion detector 270 detecting motion during the period of time, processing circuit 220 and/or power controller 250 do not remove the power from any components of CEW 200. In response to motion detector 270 not detecting movement of CEW 200 during the period of time, when the period of time lapses (e.g., expires, passes), processing circuit 220 and/or power controller 250 removes power to one or more components of CEW 200.

For example, in response to motion detector 270 not detecting movement of CEW 200 for a period of time, processing circuit 220 and/or power controller 250 removes power from flashlight 262, lasers 264, launch controller 242, signal generator 240, cartridge 280, cartridge 284, communication circuit 230, and/or display 218. Processing circuit 220 and/or power controller 250 may also be placed into a low-power operating mode to further conserve energy from power supply 290. In this example, processing circuit 220 and/or power controller 250 does not remove power from safety 214, trigger 212, and/or reactivate 216.

The period of time may be of any duration. The duration of the period of time may be programmable. The duration of the period of time may be programmable by a user of the CEW. The duration of the period of time may be determined and programmed by a department that issued and/or controls the CEW. The period of time may correspond to one or more seconds, minutes, or hours. Time and a duration of time may be measured by a clock. Handle 202, and in particular processing circuit 220 and/or motion detector 270, may include a crystal for tracking and/or measuring time and/or a real-time clock.

To bring CEW 200 out of the powered-down state, a user may operate components of CEW 200 in a predefined sequence. For example, a user may operate safety 214 to enabled, then disabled, and then operate trigger 212 and/or press reactivate 216. Any control (e.g., safety 214, trigger 212, reactivate 216, etc.) that is not used to bring CEW 200 out of the powered-down state may also be powered down. Once the appropriate control and/or sequence is operated, processing circuit 220 detects the operation of the control. In response to detecting the operation of the control, processing circuit 220 and/or power controller 250 power up the components that were previously powered down.

In another example, motion detector 270 detects movement of CEW 200 along the axes of a Cartesian coordinate system (e.g., x-axis, y-axis, z-axis). Motion detector 270 and/or processing circuit 220 measures the lapse of several periods of time. In response to motion detector 270 detecting motion during a first period of time, processing circuit 220 and/or power controller 250 do not remove the power from any components of CEW 200. In response to motion detector 270 not detecting movement of CEW 200 during a first period of time, when the first period of time lapses (e.g., expires, passes), processing circuit 220 and/or power controller 250 remove power to flashlight 262 and/or lasers 264. In response to motion detector 270 not detecting movement of CEW 200 during a second period of time, processing circuit 220 and/or power controller 250 further removes power from display 218.

The second period of time may begin after expiration of the first period of time (e.g., serial measurement). All periods of time may be measured serially, such that a subsequent period begins after the lapse of a previous period. In one embodiment, each period of time may comprise an equal duration. In one embodiment, one or more periods of time may comprise a duration longer than or shorter than the duration of at least one other period of time. For example, each period of time may be customizable based on user input, or may be preprogrammed.

In response to motion detector 270 not detecting movement of CEW 200 during a third period of time, processing circuit 220 and/or power controller 250 further removes power from signal generator 240, launch controller 242, processing circuit 282, and/or processing circuit 286. After elapse of a fourth period of time, processing circuit 220 and/or power controller 250 further removes power from communication circuit 230. After elapse of a fifth period of time, processing circuit 220 and/or power controller 250 further removes power from motion detector 270 and processing circuit 220 enters a low-power state. In the low-power state, processing circuit 220 may detect the operation of controls of user interface 210 as discussed above.

When components of CEW 200 are powered down in stages in accordance with various periods of time, power may be restored to the components of CEW 200 in various ways. If all periods of time have elapsed (e.g., fifth period) so that processing circuit 220 is in a low power state, the power may be restored to the components of CEW 200 by operation of one or more of the controls of user interface 210 as discussed above (e.g., a predefined sequence of operation, a power restore sequence, etc.). For example, safety 214 may be moved by a user to the on-position (e.g., enabled) followed by the user moving the safety to the off-position (e.g., disabled) to have power restored to all components of CEW 200.

If movement is detected in any period of time before the fifth period (e.g., periods 1 through 4), power may be restored in response to detecting movement of CEW 200 because motion detector 270 has not yet been powered down.

If movement is detected in any period of time before the fourth period (e.g., periods 1 through 3), power may be restored in response to receiving a message via communication circuit 230, because communication circuit 230 is still powered-up and/or in response to detecting movement.

At any time and in any period of time, operation of a control, for example safety 214 as discussed above, will cause processing circuit 220 and/or power controller 250 to restore power to all components of CEW 200.

Figure 3:
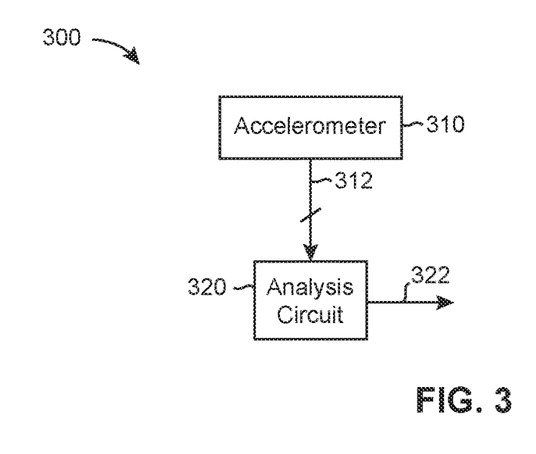
FIG. 3 is a block diagram of a motion detector.

In various embodiments, and with reference to FIG. 3, an implementation of a motion detector 300 is disclosed. Motion detector 300 is an implementation of a motion detector that performs the functions of a motion detector and/or motion detector 270, as discussed above. Motion detector 300 may include an accelerometer 310 and/or an analysis circuit 320.

An accelerometer detects acceleration. Detecting acceleration may include detecting a change in speed (e.g., velocity) over time and/or a change in direction over time. An accelerometer may detect the static and dynamic forces of acceleration. An accelerometer may detect acceleration of the object (e.g., CEW) that holds (e.g., contains, connected to) the accelerometer (e.g., dynamic acceleration) and acceleration due to the force of gravity (e.g., static acceleration). In other words, an accelerometer may detect the dynamic translational acceleration of the object to which the accelerometer is coupled and the static force of gravity acting on the object.

Figure 4:
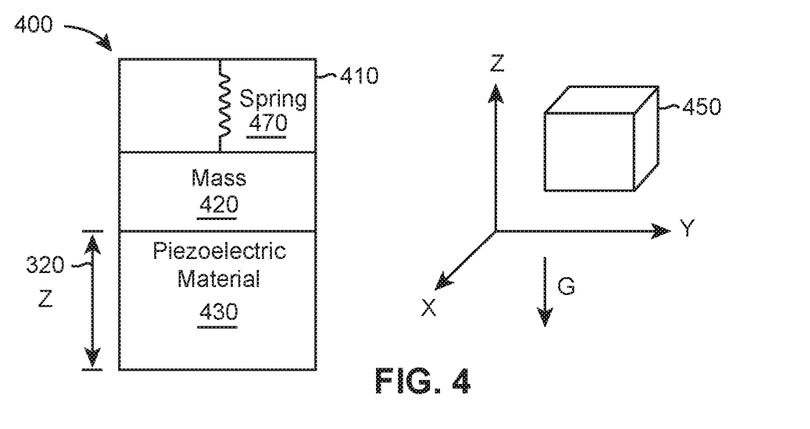
FIGS. 4-6 are block diagrams of an implementation of an accelerometer.
Figure 5:
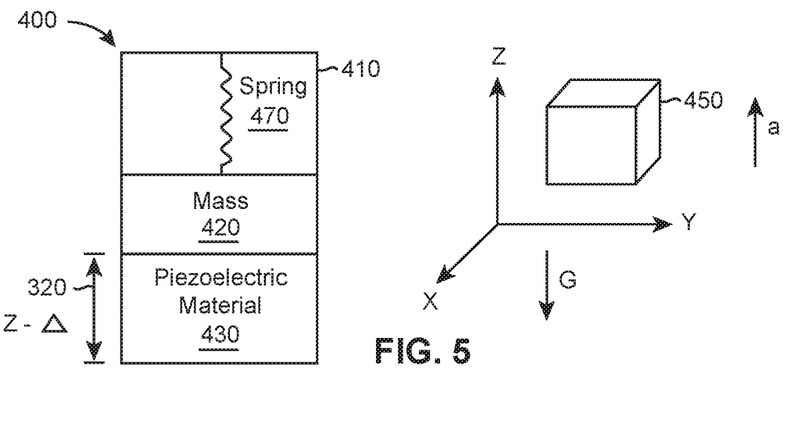
Figure 6:
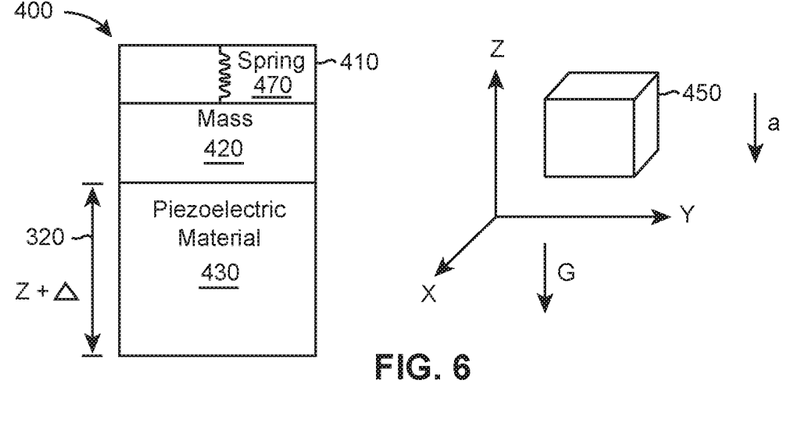

For example, referring to FIGS. 4-6, a detector 400 is a detector (e.g., sensor) in an implementation of an accelerometer (e.g., accelerometer 310, with brief reference to FIG. 3) that detects dynamic forces of acceleration of an object 450 (e.g., a CEW) and the static force of gravity G that acts on object 450. Detector 400 may be oriented to detect dynamic and static forces along the z-axis. When object 450 is stationary, with specific reference to FIG. 4, a mass 420 presses on a piezoelectric material 430 due to the force of gravity G. The force of gravity G pulls on mass 420 so that it compresses piezoelectric material 430 to a height (e.g., distance) Z. While piezoelectric material 430 is compressed to height Z, piezoelectric material 430 provides voltage V1. While object 450 is not moving, detector 400 detects the force of gravity, but not any dynamic acceleration from the movement of object 450. The compression of piezoelectric material 430 to height Z is the compressed height when object 450 is not moving.

When object 450 accelerates in the positive Z direction (e.g., upward), with specific reference to FIG. 5, dynamic acceleration force "a" and static gravitational force G act on object 450. Dynamic force of acceleration "a" and static force G causes mass 420 to compress piezoelectric material 430 to height Z−delta. While piezoelectric material 430 is compressed to height Z−delta, piezoelectric material 430 provides voltage V2. The change of the voltage provided by piezoelectric material 430 from V1 to V2 indicates an acceleration of object 450 in the positive Z direction. The change in the voltage from V1 to V2 may include providing voltages that range between voltage V1 and V2 until voltage V2 is reached.

When object 450 stops accelerating (e.g., reaches constant velocity) in the positive Z direction, the dynamic force of acceleration "a" is zero, but the static force of gravity G remains, so the compressed height of piezoelectric material 430 returns to height Z. Object 450 may still be moving in the positive Z direction, but it has stopped accelerating.

When object 450 accelerates in the negative Z direction (e.g., downward), with specific reference to FIG. 6, dynamic acceleration force "a" and static gravitational force G act on object 450. Dynamic force of acceleration "a" and static force G causes mass 420 to compress piezoelectric material 430 to height Z+delta. While piezoelectric material 430 is compressed to height Z+delta, piezoelectric material 430 provides voltage V3. The change of the voltage from piezoelectric material 430 to V3 indicates acceleration of object 450 in the negative Z direction.

The amount of compression or decompression of piezoelectric material 430 by mass 420 will depend on the force of dynamic acceleration "a" combined with the static force of gravity G. The change in compression of +/− delta is for a particular amount of acceleration. The change in compression or decompression will be different for accelerations of greater or lesser magnitudes. The magnitude of the voltages provided by piezoelectric material 430 will different in accordance with the magnitude of the acceleration.

However, when object 450 stops accelerating, whether upward or downward, or returns to rest, the compression of piezoelectric material 430 returns to the amount of compression (e.g., Z) due to the force of gravity G alone.

An accelerometer may detect (e.g., measure) acceleration in accordance with a coordinate system. An accelerometer may detect acceleration in accordance with a Cartesian coordinate system. An accelerometer may detect an acceleration along one or more axes of a coordinate system. For example, detector 400 of FIGS. 4-6 detects acceleration along the Z axis of a Cartesian coordinate system. A second detector 400 and a third detector 400 may be oriented along axes X and Y respectively so that an accelerometer comprised of the three detectors could detect acceleration in three dimensions.

An accelerometer may provide data (e.g., signals, V1, V2, V3) regarding acceleration. An accelerometer may provide acceleration data as an analog signal and/or a digital number. A digital number may include a signed digital number. Digital numbers may be represented by any number of bits (e.g., 8-bit, 16-bit, 32-bit, etc.). An accelerometer may provide data in accordance with detecting acceleration. An accelerometer may provide data in accordance with acceleration detected along one or more axes (e.g., x-axis, y-axis, z-axis).

Data provided by an accelerometer may be used to detect translational movement of an object, such as a CEW. Data provided by an accelerometer may be used to detect whether an object has moved or not moved (e.g., remained stationary).

An analysis circuit receives acceleration information from an accelerometer, analyzes the information to detect movement or no movement, and provides a result of the analysis. An analysis circuit may detect movement or no movement over a period of time.

An analysis circuit may perform any type of analysis to determine whether the information provided by the accelerometer indicates motion or the lack of motion. The analysis may include an analysis (e.g., computations, comparisons, filtering, etc.) of signals and/or data from the accelerometer. The analysis may be performed in real-time. The analysis may be performed over a period of time.

An analysis circuit may include one or more filters that filter data (e.g., analog, digital). Filters may include low-pass filters and/or high-pass filters. A filter may be implemented in any manner and use any technology. A filter may be implemented with passive components and/or active components. A filter may be implemented as a finite impulse response (FIR) filter, an infinite impulse response (IIR) filter, and/or any other suitable filter. A filter may be implemented to include any number of orders (e.g., first order, second order, etc.). A low-pass filter may be used to identify data for detecting small accelerations of an object. A high-pass filter may be used to identify data for detecting large accelerations of an object.

An analysis circuit may include a circuit that monitors information from an accelerometer to determine an average value of the information (e.g., signal, digital). An analysis circuit may include a circuit that takes a difference between two or more signals or data. An analysis circuit may include a circuit for detecting a minimum value and/or a maximum value of a signal or data. An analysis circuit may include a circuit for comparing a signal and/or data to a threshold. An analysis circuit may include a divider to divide a number represented as analog and/or digital data.

In an implementation, and with reference again to FIG. 3, accelerometer 310 is a three-axis accelerometer that detects dynamic and static acceleration along the x-axis, y-axis, and z-axis. Accelerometer 310 reports acceleration along each axis as a digital signed number. Analysis circuit 320 includes one or more filters that filter the data provided for each axis. Analysis circuit 320 may store the data from the filters over several cycles of a clock. Analysis circuit 320 may use comparators to detect when the movement of accelerometer 310 is less than a threshold. Movement less than a threshold indicates that accelerometer 310, and thus the object, has not moved.

Analysis circuit 320 may monitor the comparators for one or more periods of time. If the comparators report no movement for a period of time, analysis circuit 320 may report (e.g., provide a signal, provide data, etc.) via result 322 indicating that the object to which accelerometer 310 is attached has not moved for a period of time. Analysis circuit 320 may monitor the comparators for two or more periods of time and report a result of monitoring via result 322 for each period monitored. Processing circuit may perform some or all of the functions of analysis circuit 320.

Processing circuit 220 and/or power controller 250 may receive the result reported by analysis circuit 320. Processing circuit 220 and/or power controller 250 may perform an operation responsive to result 322. For example, processing circuit 220 and/or power controller 250 may suspend power from or provide power to one or more components of the CEW 200.

Figure 7:
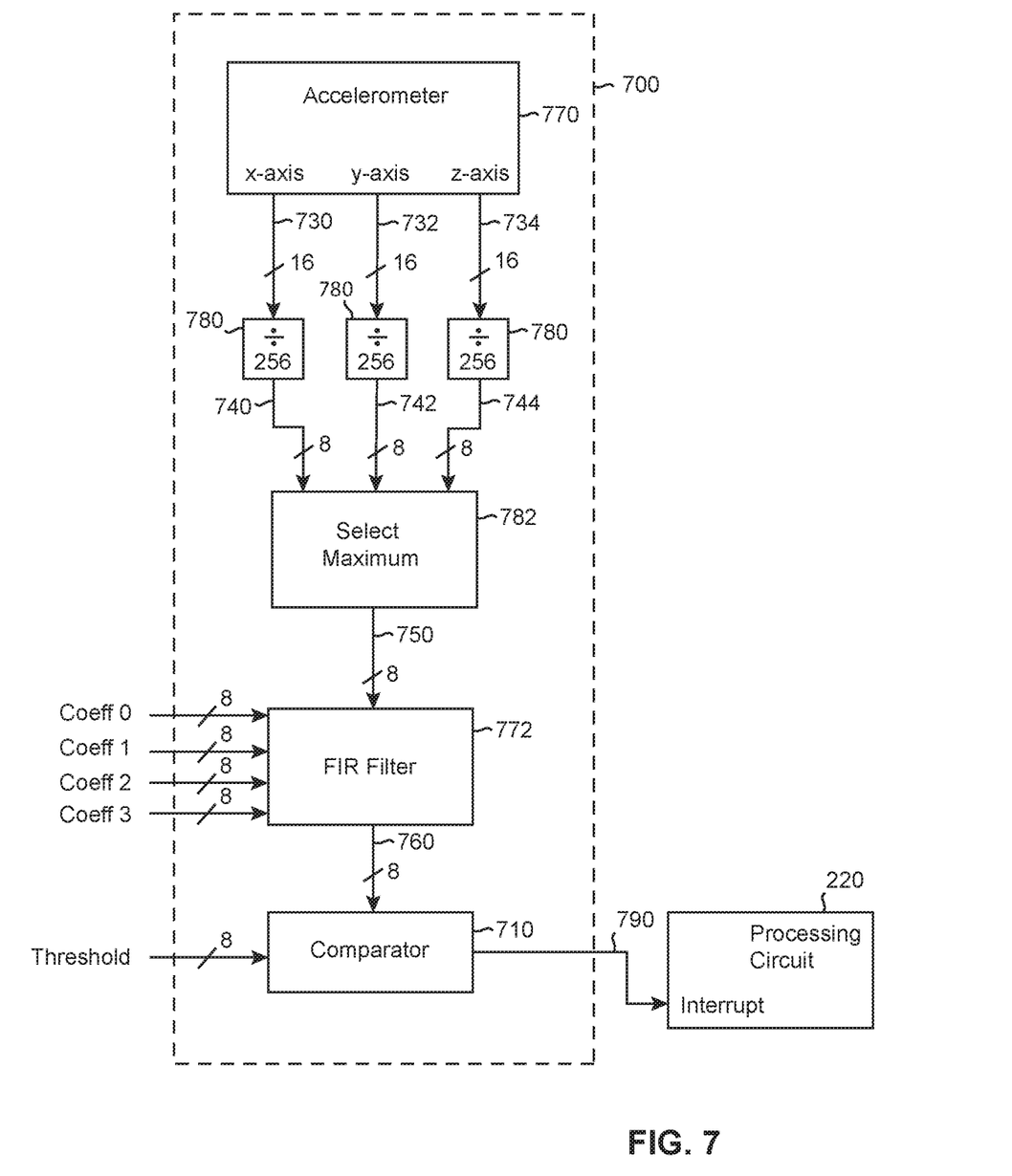
FIG. 7 is an implementation of a motion detector.

In various embodiments, and with reference to FIG. 7, a motion detector 700 is disclosed. Motion detector 700 may be an implementation of a motion detector discussed herein. Motion detector 700 may perform the functions of a motion detector as discussed above. Motion detector 700 may cooperate with processing circuit 220 and/or power controller 250 to provide power to and/or remove power from any or most of the components of CEW 200 as discussed above.

Motion detector 700 may include an accelerometer 770, one or more dividers 780, a select 782, a finite impulse response ("FIR") filter 772, and/or a comparator 710.

Figure 8:
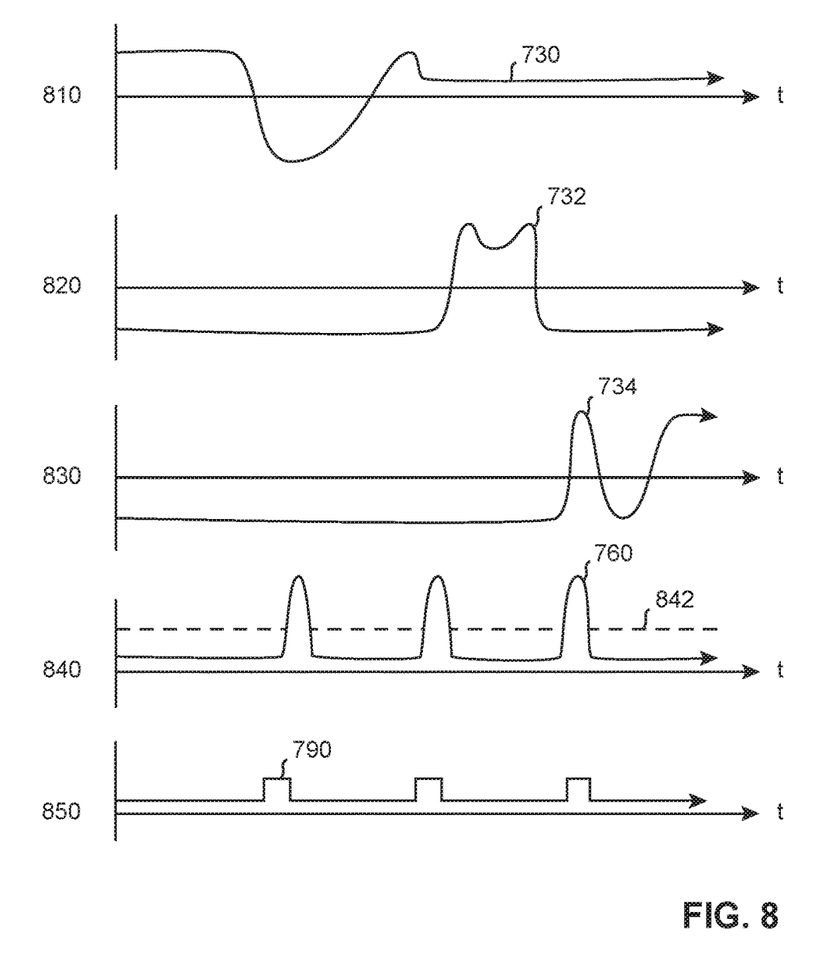
FIG. 8 is a drawing of various signals of the motion detector of FIG. 7.

Accelerometer 770 of motion detector 700 provides output data 730, 732, and 734. Output data 730, 732 and 734, shown on graphs 810, 820 and 830, with reference to FIG. 8, are respectively 16-bit signed numbers that represent acceleration along the x-axis, y-axis, and z-axis. The 16-bit numbers of output data 730, 732, and 734 represent the detected force of dynamic acceleration (e.g., acceleration "a") of an object and the force of static acceleration due to gravity (e.g., G).

When the object is at rest, the values of output data 730, 732, and 734 represent the force applied by gravity alone. Accelerometer 770 may be attached to an object that is at rest on a horizontal surface. The sensors that provide output data 730, 732, and 734 may be oriented along the x-axis, y-axis, and z-axis, respectively. Assume that the force of gravity acts only along the z-axis. The value of the 16-bit numbers for output data 730 and 732 represent the number that is provided when there is no force from dynamic acceleration and no force from gravity. Since the 16-bit numbers are signed, they could be zero or any positive or negative value. However, the output value would preferably be in about the middle of the range of the 16-bit number (e.g., about zero).

The value of the 16-bit number for output data 734 is the number that is provided by the accelerometer when there is no force from dynamic acceleration, but when there is a force of one-G from gravity. The value of the number may be any value, but it will be different from the values provided by output data 730 and 732 because it detects and reports the acceleration due to gravity. Depending on the range of the values of the 16-bit number, the value of output data 744 will be about a 1-G amount away from the values of output data 730 and 732. For example, if accelerometer 770 can measure forces of acceleration that are +/−10 times the value of G, then the value of output data 734 while the object is at rest will be the number that represents +/−1 G.

If the object were to move only along the z-axis, the changes to the output data 734 would change as discussed above with respect to detector 400. The value of the output data 734 would be the dynamic acceleration of the object and the acceleration due to the force of gravity. If the object were to move along the x-axis or the y-axis exclusively, the values of the 16-bit numbers for output data 730 and 732 would represent the values for dynamic acceleration only with no contribution from gravity.

In motion detector 700, value of output data 730, 732, and 734 may be divided by 256 (e.g., decimated, lower 8-bits truncated). Cutting off the lower 8-bits of the 16-bit numbers decreases the sensitivity (e.g., range) of the numbers reported by accelerometer 770. The lower bits of the 16-bit number represent accelerations of lower value, or lesser accelerations, than the accelerations represented by the upper bits of the 16-bit numbers. Cutting off the lower bits of the 16-bit number means that the accelerations represented by the numbers 740-744 are for more rapid accelerations or higher accelerations than the accelerations represented by the lower 8-bits. Dividing output data 730, 732, and 734 by 256 means that accelerations of lesser amounts are ignored. Numbers 740-744 are 8-bit signed numbers.

Ignoring or eliminating accelerations of a smaller value provides greater confidence that when accelerometer 770 reports an acceleration it is an acceleration that represents purposeful movement of the object and not merely fluctuations of a sensitive accelerometer.

The values of number 740, 742, and 744 may be analyzed in any manner to determine if there has been movement of the object. The values of number 740, 742, and 744 may be summed, averaged, or subtracted in an effort to determine whether the object has moved or is stationary. In one implementation of motion detector 700, number 740, 742, and 744 are provided to select 782 to determine which number is greatest. In one implementation, select 782 is implemented as a circuit. In one implementation, select 782 may be implemented using a processing circuit configured to execute a stored program.

Selecting the greatest number from number 740, 742, and 744 means that only the greatest acceleration along a single axis is considered during any period of time. In an implementation, the maximum number from numbers 740-744 is selected for each cycle of a clock. The clock may be the same clock that drives FIR filter 772. The number selected by select 782 is provided as output 750. Output 750 may be a signed, 8-bit number. Output 750 may be provided to FIR filter 772.

Figure 9:
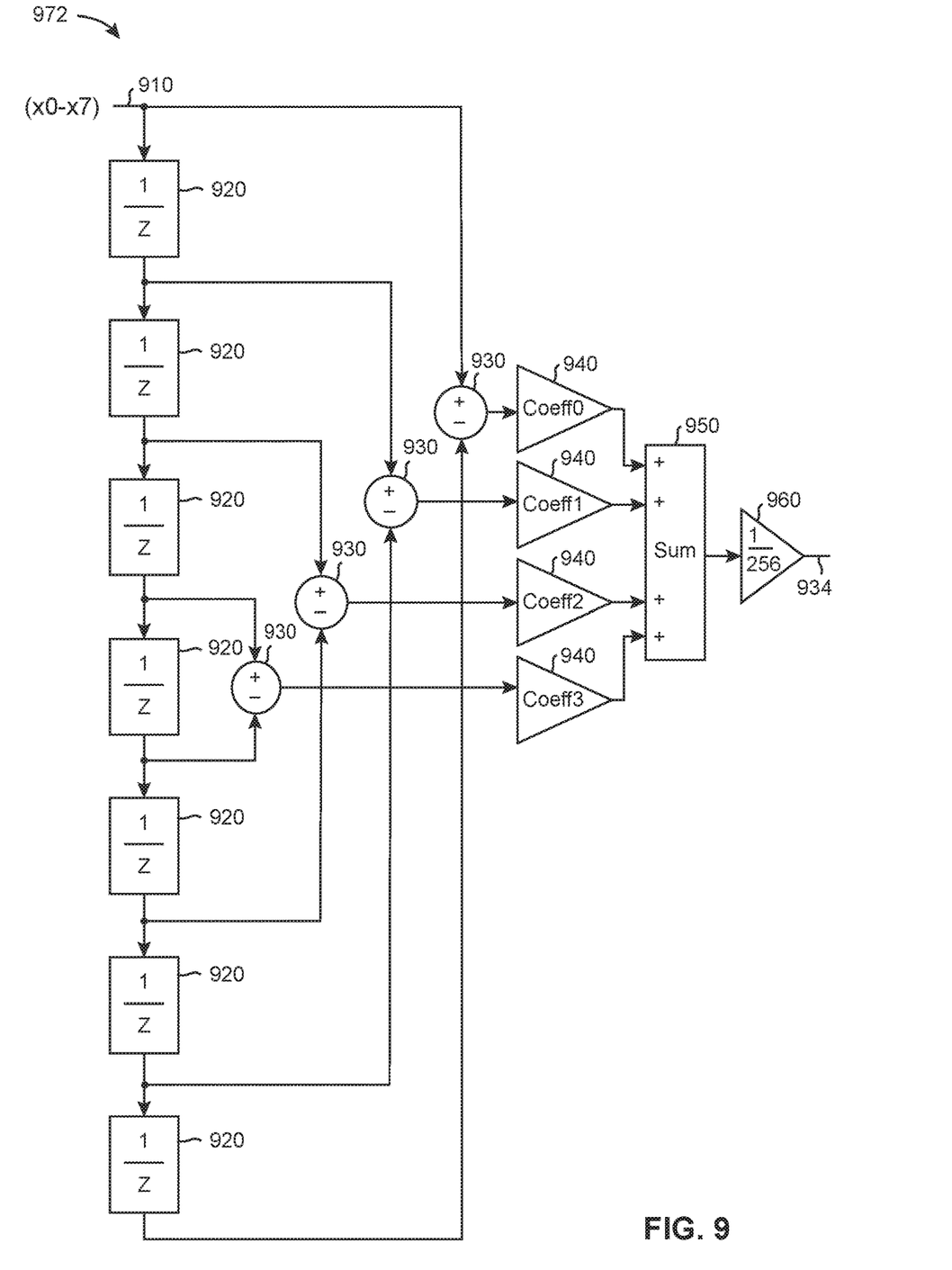
FIG. 9 is an implementation of a finite impulse response (FIR) filter for the motion detector of FIG. 7.

In an implementation, FIR filter 772 is implemented as a 7th order antisymmetric linear phase filter. An implementation of FIR filter 772 is depicted in FIG. 9. The output of FIR filter 772, output 760/934, is an 8-bit number. The absolute value of output 760, shown on graph 840, with brief reference to FIG. 8, shows rapid changes (e.g., spikes) in the value of the 8-bit number that represent movement of the CEW in any one or any combination of the axes. Each instance the value of output 760 changes rapidly, the CEW has moved.

Input 910 to FIR filter 972 is the 8-bit number from select 782. Delays 920 shifts the values of input 910 so that the value of the 8-bit number propagates through the circuit with each clock cycle of the filter. Delay 920 may delay a value for one or more cycles. In this implementation, the delay 920 is one clock cycle. Input 910 and the delayed version are combined (e.g., added, subtracted) as a signed number by summers 930. The combined numbers are multiplied by coefficient0 through coefficient3 by multipliers 940. Each coefficient is an 8-bit number. A coefficient may be stored in a register and provided to the FIR filter. The output of multipliers 940 is summed by summer 950. The output of summer 950 is divided by 256 and provided as output 934 (e.g., 760) of the FIR filter.

The function implemented by FIR filter 972 is expressed by Equation 1 below. The decimation performed by FIR filter 972 is not expressly show in Equation 1.

$$\text{Output } 934 = (X0-X7)*\text{Coefficient0} + (X1-X6)*\text{Coefficient1} + (X2-X5)*\text{Coefficient2} + (X3-X4)*\text{Coefficient3} \quad \text{Equation 1}$$

Output 760 of the FIR filter 772 is provided to comparator 710. Comparator 710 receives an 8-bit threshold. The threshold received by comparator 710 is shown as threshold 842 on graph 840 of FIG. 8. Each instance the value of the FIR filter output 760 is greater than the threshold, comparator 710 generates a pulse (e.g., high voltage) for one cycle. Each pulse provided by comparator 710 on its output 790 represents detected movement of the CEW. If comparator 710 does not provide a pulse on output 790 for a period of time, the CEW has not moved for that period of time.

Processing circuit 220 may receive the signal provided on output 790 of comparator 710. Processing circuit 220 may implement a count-down timer. Each time output 790 provides a pulse, the count-down timer is reset (e.g., starts count-down anew). If the count-down timer counts down to zero, processing circuit 220 knows that CEW 200 has been inactive (e.g., without motion) for the period of time it took to count down to zero. Each time the count-down timer reaches zero, processing circuit 220, alone or in cooperation with power controller 250, may remove the power from one or more components of CEW 200.

Processing circuit 220 may implement additional timers to track the expiration of two or more periods of time. Each time a period expires without receiving a pulse from output 790 of comparator 710, processing circuit 220 knows that CEW has not moved for that period of time. Processing circuit 220, alone or in cooperation with power controller 250, may operate to remove power from components of CEW 200 in accordance with the elapse of each period of time as discussed above.

In one implementation, motion detector 700 is implemented using an accelerometer produced by ST Microelectronics, headquartered in Geneva, Switzerland. For example, motion detector 700 may comprise an ST Microelectronics LIS3DSH. The LIS3DSH includes logic for implementing dividers 780, select 782, FIR filter 772, and comparator 710. In one implementation, the output of FIR filter 772 is provided to processing circuit 220 which implements comparator 710. In another implementation, processing circuit receives the output signals (e.g., 312, 730, 732, 734) from an accelerometer (e.g., 300, 700) and determines whether the CEW has moved.

The foregoing description discusses implementations (e.g., embodiments), which may be changed or modified without departing from the scope of the present disclosure as defined in the claims. Examples listed in parentheses may be used in the alternative or in any practical combination. As used in the specification and claims, the words "comprising," "comprises," "including," "includes," "having," and "has" introduce an open-ended statement of component structures and/or functions. In the specification and claims, the words "a" and "an" are used as indefinite articles meaning "one or more." While for the sake of clarity of description, several specific embodiments have been described, the scope of the invention is intended to be measured by the claims as set forth below. In the claims, the term "provided" is used to definitively identify an object that not a claimed element but an object that performs the function of a workpiece. For example, in the claim "an apparatus for aiming a provided barrel, the apparatus comprising: a housing, the barrel positioned in the housing," the "barrel" is not a claimed element of the apparatus, but an object that cooperates with the "housing" of the "apparatus" by being positioned in the "housing." Moreover, where a phrase similar to "at least one of A, B, or C" or "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The location indicators "herein," "hereunder," "above," "below," or other word that refer to a location, whether specific or general, in the specification shall be construed to refer to any location in the specification whether the location is before or after the location indicator.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods.

In general, functionality of computing devices described herein may be implemented in computing logic embodied in hardware or software instructions, which can be written in a programming language, such as C, C++, COBOL, JAVA, PHP, Perl, Python, Ruby, HTML, CSS, JavaScript, VBScript, ASPX, Microsoft .NET languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer-readable medium (e.g., a non-transitory medium such as a memory or storage medium) or computer storage device and be stored on and executed by one or more general purpose or special purpose processors, thus creating a special purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, processing circuit, module, or subsystem may instead be performed by one or more other devices, modules, processing circuits, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Embodiments disclosed herein include a computer-implemented method for performing one or more of the above-described techniques; a computing device comprising a processor and computer-readable storage media having stored thereon computer executable instructions configured to cause the computing device to perform one or more of the above described techniques; and/or a computer-readable storage medium having stored thereon computer executable instructions configured to cause a computing device to perform one or more of the above-described techniques.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

What is claimed is:

1. A conducted electrical weapon ("CEW") for providing a stimulus signal through a target to impede locomotion of the target, the CEW comprising:
   a cartridge comprising an electrode configured to be launched toward the target to provide the stimulus signal through the target;
   a plurality of CEW components;
   a power supply configured to provide power to the plurality of CEW components; and
   a motion detector configured to detect a movement of the CEW, wherein in response to elapse of a first period of time during which the motion detector detects no movement of the CEW, power from the power supply is not provided to at least one CEW component of the plurality of CEW components, wherein in response to elapse of a second period of time during which the motion detector detects no movement of the CEW, power from the power supply is not provided to at least a second CEW component from the plurality of CEW components, and wherein the at least one CEW component is different from the second CEW component.

2. The CEW of claim 1 wherein in response to elapse of the second period of time during which the motion detector detects no movement of the CEW, power from the power supply is not provided to the motion detector.

3. The CEW of claim 1 wherein one of the plurality of CEW components comprises a signal generator configured to provide the stimulus signal to the electrode, and wherein in response to elapse of at least one of the first period of time or the second period of time during which the motion detector detects no movement of the CEW, power from the power supply is not provided to the signal generator whereby the signal generator cannot provide the stimulus signal.

4. The CEW of claim 1 further comprising a safety, wherein in response to the safety being operated from enabled to disabled, power from the power supply is provided to at least one of the plurality of CEW components and the motion detector.

5. The CEW of claim 4 wherein one of the plurality of CEW components comprises a processing circuit, wherein in response to the safety being operated from enabled to disabled, the power supply provides power to the processing circuit, and wherein the processing circuit is configured to measure elapse of at least one of the first period of time or the second period of time.

6. The CEW of claim 4 further comprising:
   a trigger, wherein in response to the safety being operated from enabled to disabled and before elapse of the first period of time, an operation of the trigger launches the electrode from the cartridge, and wherein after elapse of the first period of time, the operation of the trigger cannot launch the electrode from the cartridge.

7. The CEW of claim 4, wherein after elapse of at least one of the first period of time or the second period of time and in response to the safety being operated from disabled to enabled and then back to disabled, power from the power supply is provided to at least one of the plurality of CEW components and the motion detector.

8. The CEW of claim 1, wherein the motion detector comprises:
   an accelerometer configured to provide at least one of a first data regarding acceleration along a first axis, a second data regarding acceleration along a second axis, and a third data regarding acceleration along a third axis; and
   an analysis circuit configured to detect the movement of the CEW based on the at least one of the first data, the second data, and the third data, and whether the CEW has moved.

9. The CEW of claim 1, wherein in response to elapse of a third period of time during which the motion detector detects no movement of the CEW, power from the power supply is not provided to at least a third CEW component from the plurality of CEW components, and wherein each of the first CEW component, the second CEW component, and the third CEW component are different.

10. A handle of a conducted electrical weapon for cooperating with a cartridge to launch an electrode toward a target, the electrode for providing a stimulus signal through the target to impede locomotion of the target, the handle comprising:
- a signal generator configured to provide the stimulus signal through the target via the electrode;
- a motion detector configured to detect a movement of the handle;
- a power supply configured to provide power to the signal generator and the motion detector; and
- a safety, wherein:
  - in response to the safety being operated from enabled to disabled, the power supply provides power to the signal generator and the motion detector, whereby the signal generator is operable to provide the stimulus signal and the motion detector is operable to detect the movement of the handle,
  - in response to elapse of a first period of time during which the motion detector detects no movement of the handle, the power supply ceases to provide power to the signal generator, whereby the signal generator cannot provide the stimulus signal, and
  - in response to elapse of a second period time during which the motion detector detects no movement of the handle, the power supply ceases to provide power to the motion detector, whereby the motion detector cannot detect the movement of the handle.

11. The handle of claim 10 wherein the first period of time is different from the second period of time.

12. The handle of claim 10 wherein after elapse of the second period of time and in response to the safety being operated from disabled to enabled and then back to disabled, the power supply provides power back to the signal generator and the motion detector.

13. The handle of claim 10 further comprising at least one of a laser for aiming, a flashlight, a launch controller, a communication circuit, and a display,
wherein in response to elapse of at least one of the first period of time or the second period of time during which the motion detector detects no movement of the handle, the power supply ceases to provide power to the at least one of the laser for aiming, the flashlight, the launch controller, the communication circuit, and the display.

14. The handle of claim 10 wherein the motion detector comprises:
- an accelerometer configured to provide a first data regarding acceleration along a first axis, a second data regarding acceleration along a second axis, and a third data regarding acceleration along a third axis; and
- an analysis circuit configured to receive the first data, the second data, and the third data, and determine in accordance with the first data, the second data, and the third data whether the handle has moved.

15. The handle of claim 14 wherein the analysis circuit comprises:
- a select circuit configured to receive the first data, the second data, and the third data, and provide a fourth data comprising a greatest of the first data, the second data, and the third data;
- a finite impulse response (FIR) filter configured to receive the fourth data and provide a fifth data in accordance with an equation: $(X0-X7)*Coefficient0+(X1-X6)*Coefficient1+(X2-X5)*Coefficient2+(X3-X4)*Coefficient3$; and
- a comparator configured to compare the fifth data to a threshold to detect whether the handle has moved.

16. The handle of claim 15 wherein
in response to the fifth data being greater than the threshold, the handle has moved, and
in response to the fifth data being less than or equal to the threshold, the handle has not moved.

17. A handle of a conducted electrical weapon comprising:
- a processing circuit;
- a safety;
- a trigger;
- a launch controller configured to launch one or more electrodes toward a target in response to an operation of the trigger;
- a signal generator configured to provide a stimulus signal through the one or more electrodes, wherein the stimulus signal is configured to impede locomotion of the target;
- a motion detector configured to detect a movement of the handle; and
- a power supply, wherein:
  - in response to the safety being in a disabled mode, the power supply is configured to provide power to the processing circuit, the launch controller, the signal generator, and the motion detector,
  - in response to the processing circuit detecting elapse of a period of time during which the motion detector does not detect movement of the handle, the processing circuit is configured to instruct the power supply to remove power from the launch controller and the signal generator, whereby the launch controller cannot launch the one or more electrodes and the signal generator cannot provide the stimulus signal, and
  - in response to the processing circuit detecting elapse of a second period of time during which the motion detector detects no movement of the handle, the processing circuit is configured to instruct the power supply to remove power from a third component from the handle.

18. The handle of claim 17 wherein in response to elapse of the period of time during which the motion detector does not detect movement of the handle:
the processing circuit is configured to instruct the power supply to remove power from the motion detector, and
the processing circuit is configured to enter a low-power state.

19. The handle of claim 17 wherein the motion detector comprises:
an accelerometer configured to provide acceleration data responsive to a coordinate system, and
an analysis circuit configured to receive the acceleration data and provide a pulse in response to detecting movement of the handle.

20. The handle of claim 19 wherein:
the processing circuit includes a count-down timer,
responsive to the pulse, the processing circuit is configured to set the count-down timer to a number, and
in response to the count-down timer counting down to zero from the number, the processing circuit is configured to detect elapse of the period of time.

* * * * *